Jan. 8, 1929.
O. C. TERRELL
1,698,111
STEMMING, PARING, AND CORING TOOL
Filed March 4, 1927
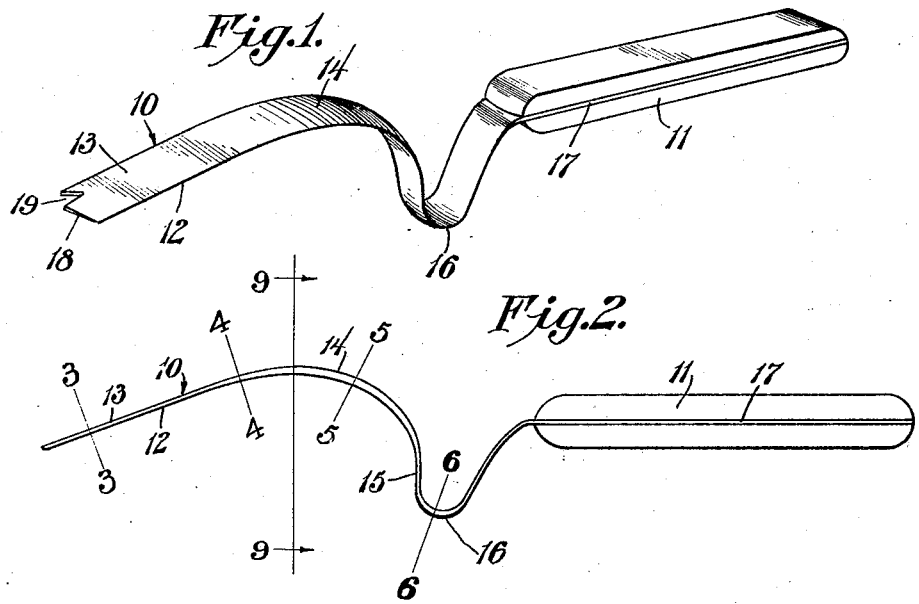
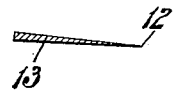   
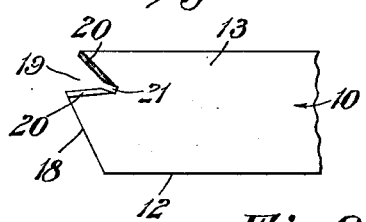 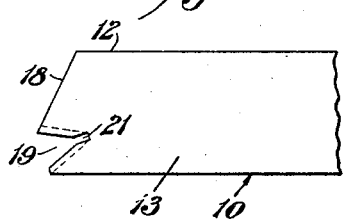
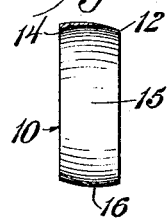
Witnesses
C. L. McDonald
E. N. Lovewell
Inventor
Oliver C. Terrell
By
C. G. Siggers
Attorney Patented Jan. 8, 1929.

1,698,111

UNITED STATES PATENT OFFICE.

OLIVER CLARK TERRELL, OF PORTLAND, OREGON.

STEMMING, PARING, AND CORING TOOL.

Application filed March 4, 1927. Serial No. 172,857.

This invention relates to a tool especially adapted for use in stemming, paring and coring pomaceous fruits, and for performing analogous operations on other similar fruits and vegetables.

One of the objects of the invention is to provide a tool having a blade with portions shaped to conform in a general way, both longitudinally and transversely, to the respective convex portions and depressions found on the surface of the fruit or vegetable, so that the peeling and other waste portions may be removed most expeditiously without any unnecessary waste of the edible portion.

A further object of the invention is to provide a tool, which is especially adapted for removing the stem from the fruit, particular attention being paid to the desirability of pulling out the entire stem without breaking or cutting off the same.

The present invention is in the nature of an improvement on the paring knife, which constitutes the subject matter of U. S. Patent 1,508,628, issued to me September 16, 1924.

The objects and advantages of the present invention will be more fully explained in the following detailed description, which is to be taken in connection with the accompanying drawing illustrating the same.

In the drawing:

Figure 1 is a perspective view of the invention.

Figure 2 is a side elevation of the same.

Figures 3, 4, 5 and 6 are sections taken transversely of the blade on the lines 3—3, 4—4, 5—5 and 6—6 of Figure 2.

Figure 7 is a detail view of the end portion of the blade showing the stemmer.

Figure 8 is another view of the same taken from the opposite side.

Figure 9 is a transverse section taken on the line 9—9 of Figure 2.

The tool, which constitutes the subject matter of the present invention, comprises a blade 10, having a handle 11 secured thereto, one side edge of the blade being sharpened, as shown at 12. The end portion 13 of the blade, which is remote from the handle 11 is flat, and merges into a major curved portion 14, the under surface of which, as it is held in the position shown in Figure 1, is concave both longitudinally and transversely. As the flat portion 13 merges into the major curved portion 14, the degree of curvature gradually increases, being comparatively slight at the line 4—4, and reaching the maximum curvature at the line 5—5, whence the curvature gradually decreases to the point indicated at 15 in Figure 2. At this point, the major curved portion merges into a minor oppositely curved portion 16, which gradually increases in degree to the line 6—6, whence it gradually diminishes to the point where it merges into the flat portion 17 which is secured to the handle.

Throughout the entire length of both the major curved portion and the minor curved portion, the blade is also transversely curved, as shown in Figures 4, 5 and 6, so that the under surface of the blade portion 14, when held in the position shown in Figure 1, is transversely concave, and the line of intersection thereof by a transverse plane perpendicular to the blade is a true arc of a circle, the radius of the circle being smallest at the point of maximum longitudinal curvature, and gradually increasing toward either end in proportion to the decrease in the degree of longitudinal curvature. The minor curved portion has a surface similarly curved but in the opposite direction. The under surface of the major curved portion 14 is, therefore, concave, both longitudinally and transversely, with the greatest degree of curvature at the line 5—5, while the under surface of the minor curved portion 16 is convex, both longitudinally and transversely, with its greatest convexity at the line 6—6.

The blade 10 terminates at its outer end in an edge 18, which extends at an obtuse angle from the sharpened edge 12 toward the back of the blade, with which it forms an acute angle. The corner toward which the end 18 and the back of the blade converge is, however, cut away to form a V-shaped notch 19, which extends inwardly in an oblique direction. The sides of this notch are beveled, as shown at 20, in a direction to form sharpened edges with the face of the blade which is lowermost in Figures 1, 2 and 7. The inner edge, or apex, of this notch is prolonged by a kerf 21, having straight flat opposite sides, which are parallel to a line bisecting the apex of the notch.

The purpose of the specific construction of the notch is to enable it to be used for pulling the stems from the fruit, without cutting or breaking them. In using it for this purpose, the notched portion of the blade is held with the sharpened edges uppermost, as shown in Figure 8. In this position, it is inserted in the depression containing the stem, so as to engage the stem near the point where it enters the fruit. The sharpened edges of the notch enable the stemmer to take hold of the stem, but do not cut it off. The stem, on the contrary, is wedged into the kerf 21, and held therein, at the same time being engaged by the inner portions of the sharpened edges, and a rocking longitudinal motion of the blade will quickly pull out the stem. In the absence of a kerf at the inner end of the notch, the stemmer might be used successfully with old, hard, dry stems, but with fresh stems, which are comparatively soft, it would cut the stems instead of pulling them out.

In using my improved tool for paring apples, the stem is first removed, as above described, leaving the stem depression clear, and ready to have the skin removed.

The apple is now held in the left hand with the stem depression uppermost. The tool is then held in the right hand with the center portion of the minor curve extending away from the operator, with the cutting edge pointing downwardly. The edge is then pressed against the far wall of the depression, and downwardly at the same time beneath the skin. The blade is then given a half turn, imparting to the minor curve a scooping motion, which removes all of the skin from the depressed portion surrounding the stem hole.

The apple is now turned on its side with the stem end toward the right. Now, with the minor curve within the stem depression, and with the major curve against the crown of the fruit, the apple is revolved in the left hand. With one revolution of the apple, all of the skin should be removed from the crown thereof.

The major curve of the blade is next adjusted to the side wall of the apple, and one more revolution should remove all of the remaining skin, except a small portion in the blossom depression, which is then removed in the same manner as the skin was previously removed from the stem depression.

The apple is then cut in half by means of the straight portion 13 of the blade, and the core is readily scooped out from each half by means of the minor curve portion 16. Thus, two strokes remove the core, where previously it was necessary to cut the apple into quarters.

In performing the several operations in removing the skin and core, it will be readily seen that the transverse curvature of the several portions of the blade is of material assistance, while the stemmer enables the operator to positively pull out the stem by the roots with a single motion of the hand.

While I have described in considerable detail the preferred construction of the invention, it is apparent that the construction thereof is not necessarily limited to the exact form and shape described, but may be considerably modified without any material departure from the salient features of the invention as claimed.

What is claimed is:

1. A tool for working on fruits or vegetables, comprising a blade having one face longitudinally concave on varying lengths of radii for a portion of its length and conforming approximately to a longitudinal surface line of the fruit, and also transversely concave on varying lengths of radii and conforming approximately to successive lines drawn circumferentially on the surface of the fruit.

2. A paring knife blade having the intermediate portion of its under face concaved both longitudinally and transversely on varying lengths of radii which become maximum at the ends of said portion; the intermediate portion merging at one end into a minor portion, the under face of which is convex both longitudinally and transversely on varying lengths of radii, and at the other end into a substantially flat portion.

3. A tool for working on fruits or vegetables, comprising a cutting blade having on one face a curved surface extending for a part of its length, said surface having a major portion which is concave both longitudinally and transversely on varying lengths of radii, and merging into a minor portion which is convex both longitudinally and transversely on varying lengths of radii, the transverse curvature of each portion being such that a plane transverse to the knife blade and perpendicular thereto will intersect said surface in the arc of a circle, whose radius is directly proportional to the radius of the longitudinal curvature of the surface at the intersection.

4. A tool for working on fruits or vegetables, comprising a blade having a side edge and an end edge with a V-shaped notch formed between the converging ends of said edges, the edges of said notch being beveled, and the apex of the notch being prolonged by a kerf having sides parallel to a line bisecting the V.

5. A tool for working on fruits or vegetables, comprising a blade having a side edge and an end edge which form an acute angle with each other, and having a V-shaped notch extending diagonally inwardly from the corner between the converging ends of said edges, the edges of said notch being beveled, and the apex of the notch being prolonged by a kerf having sides parallel to a line bisecting the V.

In testimony, that I claim the foregoing as my own, I have hereto affixed my signature.

OLIVER CLARK TERRELL.